(12) United States Patent
Walker (10) Patent No.: US 11,203,148 B1
(45) Date of Patent: Dec. 21, 2021

(54) CONDUIT BENDING APPARATUS

(71) Applicant: Faith Technologies, Inc., Menasha, WI (US)

(72) Inventor: Ian Jordan Walker, Archie, MO (US)

(*) Notice: Subject to any disclaimer, the term of this patent is extended or adjusted under 35 U.S.C. 154(b) by 497 days.

(21) Appl. No.: 16/399,633

(22) Filed: Apr. 30, 2019

(51) Int. Cl.
*B29C 53/08* (2006.01)
*B29C 53/84* (2006.01)
*B29K 27/06* (2006.01)

(52) U.S. Cl.
CPC .......... *B29C 53/083* (2013.01); *B29C 53/84* (2013.01); *B29K 2027/06* (2013.01)

(58) Field of Classification Search
None
See application file for complete search history.

(56) References Cited

U.S. PATENT DOCUMENTS

| | | | | |
|---|---|---|---|---|
| 3,376,606 A * | 4/1968 | Deines | ................. | B29C 53/083 425/384 |
| 3,753,635 A | 8/1973 | Barnett | | |
| 3,776,539 A * | 12/1973 | Curtis | ................. | B29C 53/083 269/81 |
| 4,255,378 A | 3/1981 | Miller et al. | | |
| 5,125,825 A * | 6/1992 | Janosco | ................. | B21D 7/085 249/53 R |
| 5,290,166 A | 3/1994 | Heatherly | | |
| 5,669,258 A * | 9/1997 | Luebke | ................. | B21D 7/063 33/377 |
| 5,853,289 A | 12/1998 | Todd et al. | | |
| 8,118,586 B2 * | 2/2012 | Trebilcock | ............. | B21D 7/022 425/403 |
| 2005/0121834 A1 * | 6/2005 | Ezure | ..................... | B29C 53/84 264/449 |
| 2012/0325363 A1 * | 12/2012 | Knebl | ..................... | B29C 53/84 138/177 |
| 2016/0311149 A1 * | 10/2016 | Weinhardt | ............ | B29C 53/083 |

* cited by examiner

*Primary Examiner* — Marc C Howell
*Assistant Examiner* — Nicholas J Chidiac
(74) *Attorney, Agent, or Firm* — Randall W. Fieldhack (57) ABSTRACT

An apparatus for bending a plastic conduit section including a tabletop surface; a base surface adjacent a front edge, wherein the base surface is perpendicular to the tabletop surface; and a movable arm having a proximal end and a movable arm surface, wherein the movable arm surface is perpendicular to the tabletop surface, and wherein the proximal end is pivotably attached to the base surface such that the movable arm is configured to pivot azimuthally around the proximal end along the tabletop surface. The apparatus also includes a locking mechanism configured to lock the movable arm such that the movable arm surface is at a desired angle to the base surface; a hot box configured to heat plastic conduit; and a water drainage system disposed adjacent the tabletop surface and configured to remove water from the tabletop surface.

20 Claims, 5 Drawing Sheets

CONDUIT BENDING APPARATUS

BACKGROUND

Modern construction often requires runs of power, data, control, and sensor cabling that are extensive in terms of both distance and the number of cables to be run. For reasons of organization, security, and physical protection, such runs are often placed underground. Underground runs of cabling can be required to reside within solid conduit. Because PVC conduit is not as flexible as most cabling, PVC conduit that must accommodate turns, rises, offsets, and declines needs to either be manufactured with such bends, or have bends created in otherwise straight sections. The long lead times needed to acquire conduit with customized bends leads many installers to create their own bends to meet the requirements of their construction drawings.

Previous attempts at providing a bending apparatus for use by installers, such as those described in U.S. Pat. Nos. 3,753,635; 3,776,539; 4,255,378; 5,125,825; 5,290,166; and 5,853,289, used various clamping mechanisms sometimes attached to a pole or pivoting arms. These apparatuses are typically complex, have difficulty accommodating larger conduit diameters, and despite being designed for field use are cumbersome to use.

This is further complicated by the fact that a section of 6-inch diameter schedule 40 PVC conduit typically used in underground electrical construction is 20 feet long and weighs 77 pounds. Attempting to bend such a conduit section at a construction site requires wrestling the conduit section into and then out of a heating mechanism, and then into a clamping system requiring multiple adjustments and settings. Pouring water on the conduit section to cool the conduit section and set the bend can create a hazardous mess with either wet concrete or mud underfoot. This process also requires multiple workers. Finally, a single duct bank unit might require four, six, eight, nine, twelve, or more conduit sections each having the same bend as the first conduit section, and many duct bank units are typically needed.

To make a large number of customized PVC underground duct banks, a more efficient and safer method for bending PVC conduit is needed, particularly one that can create various bend angles and accommodate various conduit diameters.

SUMMARY

The present disclosure solves these issues by providing an ergonomic, adjustable conduit bending apparatus that has resulted in faster production times with less risk of injury due to both reduced worker fatigue and reduced worker time to create bends. Further, the conduit bending apparatus of the present disclosure can be operated by one worker, which also reduces the risk of injury. The conduit bending apparatus of the present disclosure is flexible enough to change quickly to accommodate different bend angles and different conduit diameters, while also being able to create identical bends in multiple conduits.

In one aspect, the present disclosure provides an apparatus for bending a plastic conduit section having ends and a radius, the apparatus including a tabletop surface having a front edge, a rear edge, and two side edges; a base surface adjacent the front edge, wherein the base surface is perpendicular to the tabletop surface; and a movable arm having a proximal end, a distal end, and a movable arm surface, wherein the movable arm surface is perpendicular to the tabletop surface, and wherein the proximal end is pivotably attached to or adjacent to the base surface such that the movable arm is configured to pivot azimuthally around the proximal end along the tabletop surface. The apparatus also includes a locking mechanism configured to lock the movable arm such that the movable arm surface is at a desired angle to the base surface; a hot box disposed adjacent the tabletop surface and configured to heat plastic conduit; and a water drainage system disposed adjacent the tabletop surface and configured to remove water from the tabletop surface.

In another aspect, the present disclosure provides an apparatus for bending a plastic conduit section having ends and a radius, the apparatus including a tabletop surface having a front edge, a rear edge, and two side edges; a base surface adjacent the front edge, wherein the base surface is perpendicular to the tabletop surface; and a movable arm having a proximal end, a distal end, and a movable arm surface, wherein the movable arm surface is perpendicular to the tabletop surface, wherein the proximal end is pivotably attached to or adjacent to the base surface such that the movable arm is configured to pivot azimuthally around the proximal end along the tabletop surface, wherein the base surface and the movable arm surface each have heights, and wherein the heights are greater than the radius of the conduit section. The apparatus also includes an angle indicator configured to indicate the angle of the movable arm surface relative to the base surface; a locking mechanism configured to lock the movable arm such that the movable arm surface is at a desired angle to the base surface; a hot box disposed adjacent the tabletop surface and configured to heat plastic conduit; and a water drainage system disposed adjacent one side edge and configured to remove water from the tabletop surface, wherein the tabletop surface is tilted such that the side edge without the water drainage system is higher in elevation than the side edge with the water drainage system.

In an alternate aspect of the present disclosure, an apparatus for bending a plastic conduit section having ends and a radius includes a tabletop surface having a front edge, a rear edge, and two side edges, wherein the tabletop surface is tilted such that the rear edge is higher in elevation than the front edge; a base surface adjacent the front edge, wherein the base surface is perpendicular to the tabletop surface; and a movable arm having a proximal end, a distal end, and a movable arm surface, wherein the movable arm surface is perpendicular to the tabletop surface, wherein the proximal end is pivotably attached to or adjacent to the base surface such that the movable arm is configured to pivot azimuthally around the proximal end along the tabletop surface, wherein the base surface and the movable arm surface are planar and each have heights, and wherein the heights are greater than the radius of the conduit section. The apparatus also includes an angle indicator configured to indicate the angle of the movable arm surface relative to the base surface, wherein the angle indicator is disposed on the tabletop surface; a locking mechanism configured to lock the movable arm such that the movable arm surface is at a desired angle to the base surface; a hot box disposed adjacent the tabletop surface and configured to heat plastic conduit; and a water drainage system disposed at one side edge and configured to remove water from the tabletop surface, wherein the tabletop surface is tilted such that the side edge without the water drainage system is higher in elevation than the side edge with the water drainage system.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

Reference now will be made in detail to various aspects of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus, it is intended that the present disclosure covers such modifications and variations as come within the scope of the appended claims and their equivalents.

Generally speaking, the present disclosure is directed to an apparatus for bending a plastic conduit section. The most common form of plastic conduit is made from polyvinyl chloride (PVC). A section of conduit is generally tubular with two ends, an outer surface, an inner surface, an outside diameter, and inside diameter, and a radius. One size typically used in large commercial construction is a 6-inch diameter schedule 40 PVC conduit with a length of 20 feet and a weight of about 77 pounds. Because PVC conduit is not as flexible as most cabling, PVC conduit that must accommodate turns, rises, offsets, and declines needs to either be manufactured with such bends, or have bends created in otherwise straight sections. The long lead times needed to acquire conduit with customized bends leads many installers to create their own bends to meet the requirements of their construction drawings.

To streamline duct bank builds, the ergonomic, adjustable steel jig table of the present disclosure has resulted in faster production times with less risk of injury due to worker fatigue. The addition of an auto-rotating hot box can eliminate the need for two people to perform this process. The table is flexible enough to change quickly to different style builds.

Figure 1:
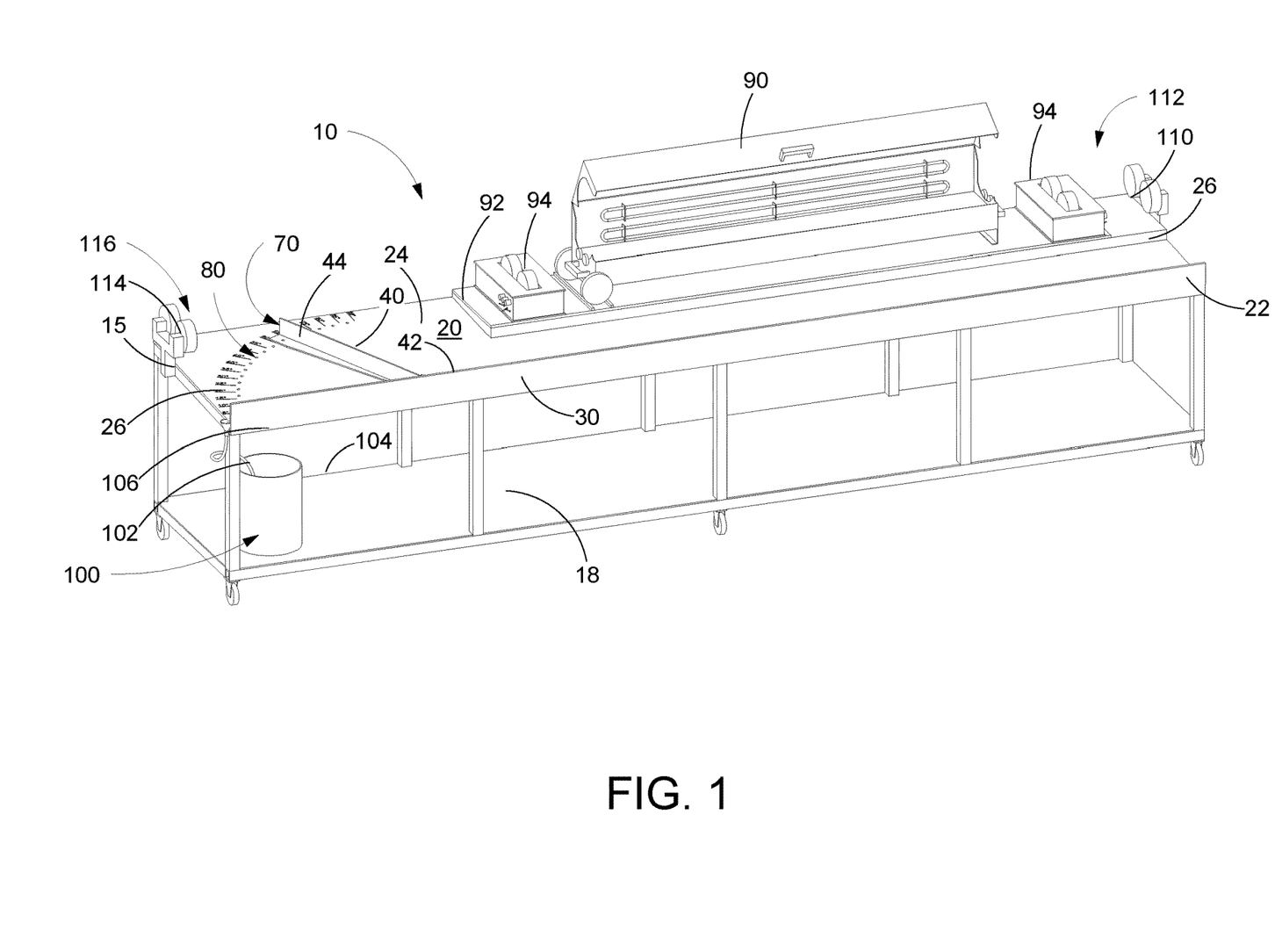
FIG. 1 representatively illustrates an elevation view of the conduit bending apparatus of the present disclosure.

FIGS. 1-5 illustrate the adjustable jig table apparatus 10 of the present disclosure. As illustrated in FIG. 1, the jig table apparatus 10 includes a tabletop 15 having a tabletop surface 20. The tabletop 15 is supported upon a table frame 18. The table frame 18 can be of any suitable design capable of supporting a tabletop 15 as described herein. The table frame 18 can be a standard tabletop support structure having four, six, eight, or more legs. In other aspects, one or more legs can be replaced with a wall mount. In another aspect, the tabletop 15 can be disposed on another table having a frame and its own tabletop. Any table frame 18 capable of supporting a tabletop 15 meeting the requirements of the present disclosure can be employed.

The tabletop 15 of the present disclosure includes a tabletop surface 20, generally opposite the tabletop 15 from the table frame 18. The tabletop surface 20 includes a front edge 22, a rear edge 24, and two side edges 26. The tabletop 15 and tabletop surface 20 can be of any suitable material and are preferably water-impermeable. In one aspect, the tabletop 15 is manufactured from a suitable metal such as steel both to resist water permeation and to provide an impact- and heat-resistant surface to resist damage from heavy conduit sections, heated conduit sections, and the water used to cool the conduit sections.

The tabletop 15 includes a base structure 30 having a base surface 32. The base structure 30 is attached to either the tabletop 15 or the table frame 18 and disposed adjacent the front edge 22 of the tabletop surface 20 such that the base surface 32 is perpendicular to the tabletop surface 20.

The tabletop 15 also includes a movable arm 40 pivotably attached either to the tabletop 15 at the tabletop surface 20 or to the base structure 30 adjacent the base surface 32. The movable arm 40 has a proximal end 42, a distal end 44, and a movable arm surface 46. The movable arm 40 is pivotably attached at its proximal end 42 such that the movable arm 40 can pivot azimuthally around its attached proximal end 42 to sweep an arc on the tabletop surface 20. The movable arm surface 46 is perpendicular to the tabletop surface 20 throughout the swept arc of the movable arm 40.

Figure 4:
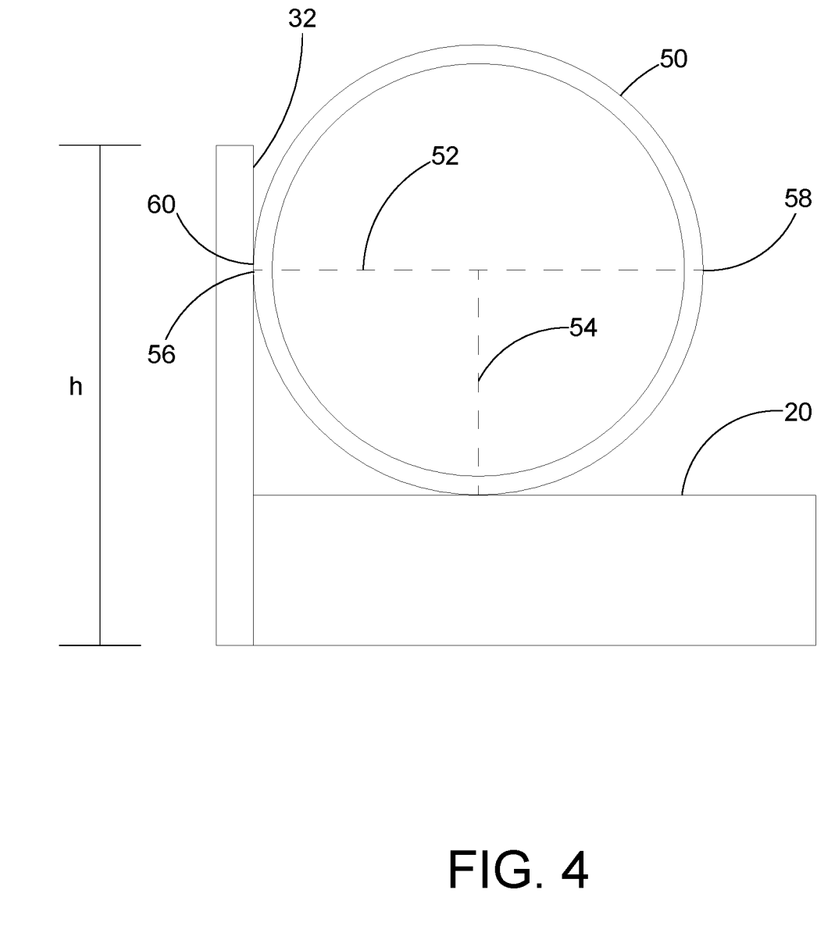
FIG. 4 is a two-dimensional schematic representation of a cross section of a conduit section as it resides on the conduit bending apparatus of FIG. 1.

The base surface 32 and the movable arm surface 46 each have a height h, as illustrated in FIG. 4. FIG. 4 is a two-dimensional schematic representation of a cross section of a conduit section 50 as it resides on the tabletop surface 20. The vertical surface shown in FIG. 4 can be either the base surface 32 or the movable arm surface 46. As illustrated, the conduit section 50 has an outside diameter 52 and an outside radius 54. The conduit section 50 as it resides on the tabletop surface 20 also has an outer bend edge 56 and an inner bend edge 58. The outer bend edge 56 is where on the conduit section 50 the conduit section 50 contacts the movable arm surface 46 and/or the base surface 32. The inner bend edge 58 is diametrically opposite the outer bend edge 56 such that a plane defined by the outer bend edge 56 and the inner bend edge 58 is generally parallel to the tabletop surface 20. The conduit section 50 contacts the movable arm surface 46 and/or the base surface 32 at a contact point 60 in the two-dimensional FIG. 4 or a contact line in three dimensions. The movable arm surface 46 and the base surface 32 each contact the outer bend edge 56 and not the inner bend edge 58.

To effectively bend a conduit section 50, the height h of the movable arm and base surfaces 46, 32 should be greater than the elevation of the contact point 60, which means the height h of the movable arm and base surfaces 46, 32 should be greater than the outside radius 54 of the conduit section 50 to be bent, as illustrated in FIG. 4. If the height h of either the movable arm surface 46 or the base surface 32 is less than the outside radius 54 of the conduit section 50, then the conduit section 50 might pop over the base structure 30 or movable arm 40 when lateral pressure, pressure applied generally parallel to the tabletop surface 20, is applied to the conduit section 50 in the region of the inner bend edge 58.

Situations in which a conduit section 50 has a contact point 60 higher than the height h of the movable arm and/or base surfaces 46, 32 can also be addressed by applying pressure to the conduit section 50 perpendicularly to the tabletop surface 20 to hold down the conduit section 50.

Figure 5:
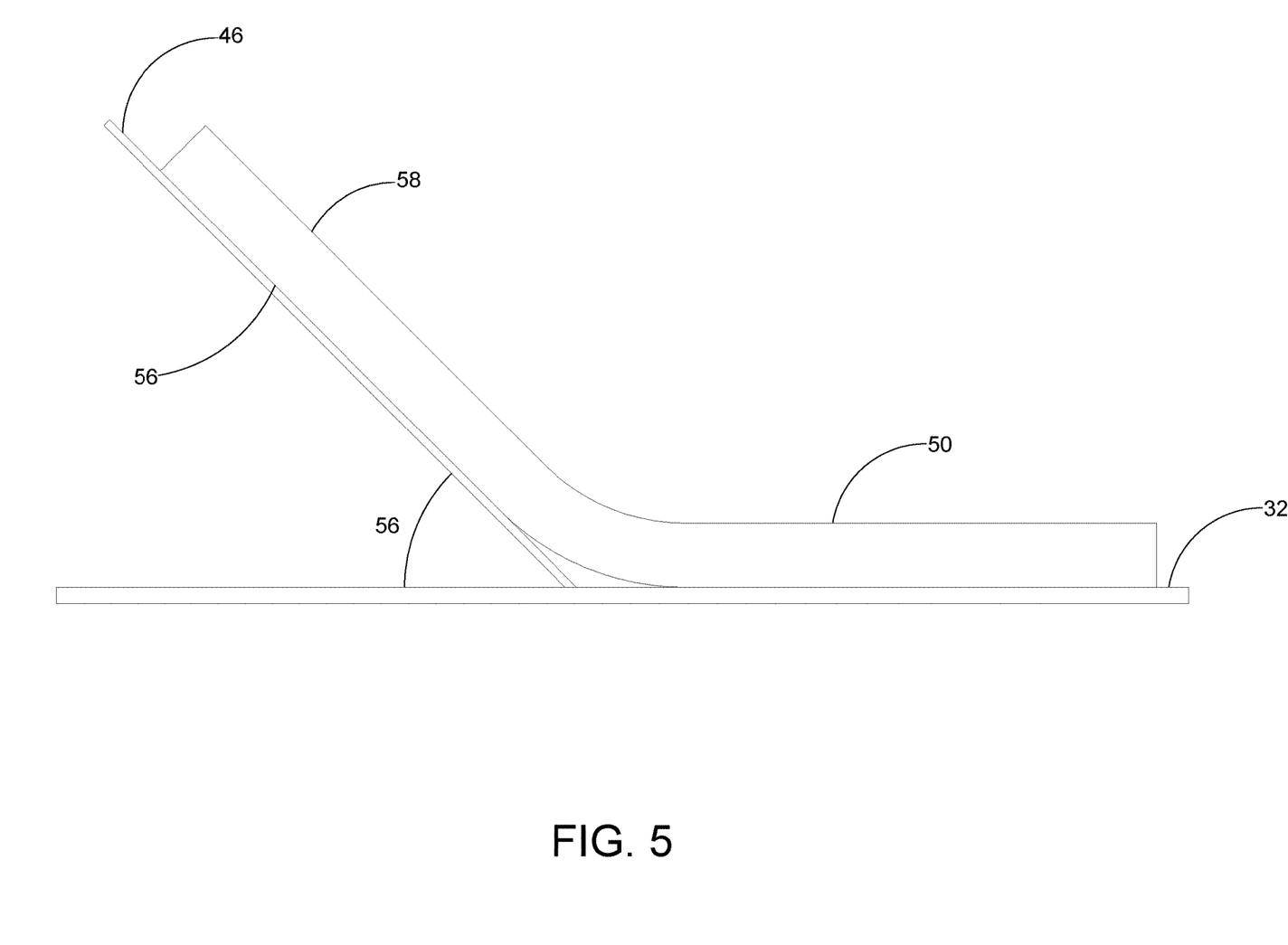
FIG. 5 is a two-dimensional schematic representation of the plan view of a conduit section as it resides on the conduit bending apparatus of FIG. 1.

In a bending operation, the base surface 32 and the movable arm surface 46 are set at a desired angle θ, which is the supplementary angle to the angle required to be formed in the conduit section 50, as illustrated in FIG. 5. FIG. 5 is a two-dimensional schematic representation of the plan view of a conduit section 50 as it resides on the tabletop surface 20 (the plane of the figure). The base surface 32 is a straight angle, and the movable arm surface 46 defines the two supplementary angles (θ and 180−θ) that make up that straight angle.

In most aspects of the present disclosure such as those illustrated in FIGS. 1-5, the movable arm surface 46 and the base surface 32 are generally planar to accommodate conduit sections 50 with different outside diameters 52. With a planar base surface 32, for example, the base surface 32 can accommodate various contact points and therefore can accommodate conduit sections of various radii. In other aspects, the movable arm and/or base surfaces 46, 32 can be concave, particularly if the apparatus 10 is intended to accommodate only conduit sections of identical radius, where the curvature of the movable arm and/or base surfaces 46, 32 preferably matches the outside radial curvature of the conduit section.

The tabletop 15 includes a locking mechanism 70 configured to lock the movable arm 40 at a desired angle θ to the base surface 32. The locking mechanism 70 can include a bolt 72 or similar structure mounted to or near the distal end 44 of the movable arm 40. Similarly, the tabletop surface 20 can include holes 74 associated with given angles θ along the swept arc, whereby inserting the bolt 72 in the hole 74 associated with a desired angle θ will lock the movable arm 40 at that desired angle θ. In other aspects of the present disclosure, the locking mechanism holes 74 can be connected to form a slot 76 in the tabletop surface 20. The slot 76 is preferably arcuate to match the swept arc of the movable arm 40. With the use of a slot 76 the bolt 72 will need further or replacement locking hardware such as a nut or other fastener or anchor below the tabletop 15, or an alternative clamping mechanism configured to lock the movable arm 40 at a desired angle θ. Any suitable hardware for locking the movable arm 40 at a desired angle θ to the base surface 32 can be employed.

Figure 2:
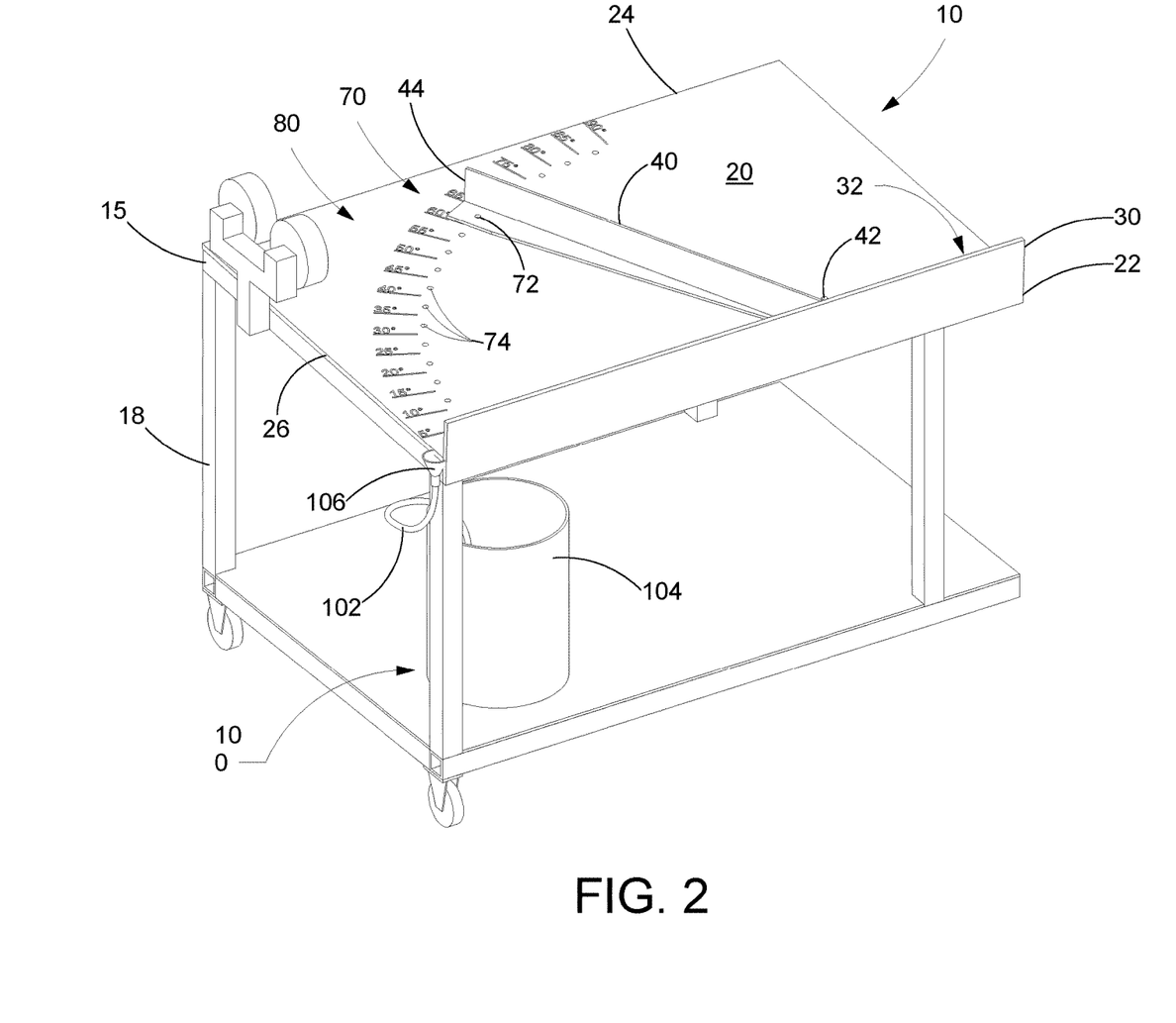
FIG. 2 representatively illustrates a closeup perspective view of a portion of the conduit bending apparatus of FIG. 1.
Figure 3:
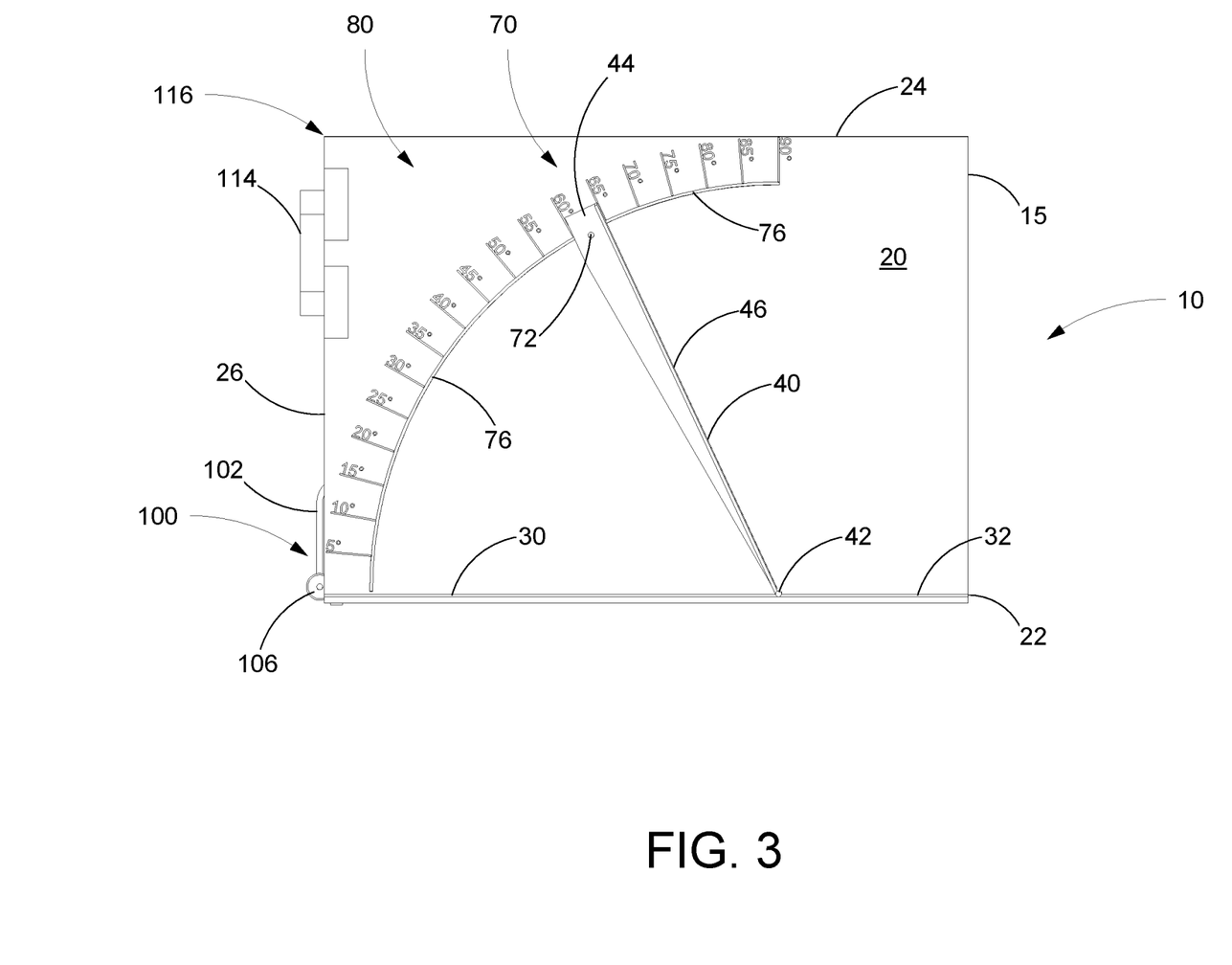
FIG. 3 representatively illustrates an alternative closeup perspective view of a portion of the conduit bending apparatus of FIG. 2.

The tabletop 15 also includes an angle indicator 80 configured to indicate the angle θ of the movable arm 40 relative to the base surface 32 such that a user will know if the apparatus 10 is set to a proper angle for a desired bend. The angle indicator 80 can be markings disposed on the tabletop surface 20 as illustrated in FIGS. 2 and 3. The angles can be marked at one degree, five degree, ten degree, or any other suitable increments. In other aspects of the present disclosure, the angle indicator 80 can be a protractor-type device disposed on the tabletop surface 20, on the movable arm 40, or on the base structure 30.

The apparatus 10 also includes a hot box 90 disposed adjacent the tabletop surface 20 as illustrated in FIG. 1. The hot box 90 is configured to heat a portion of the plastic conduit section 50 to make that portion more pliable and receptive to bending. In one aspect, the hot box 90 can be mounted to the tabletop surface 20 with or without an intervening support 92. In other aspects, the hot box 90 can be mounted to a separate structure or to a wall adjacent the tabletop surface 20. The hot box 90 is positioned in such a manner to minimize the number of users needed to handle the heated conduit section 50 as well as minimizing the time that elapses between heating and bending. Minimizing the transfer time is important because the conduit section 50 upon removal from the hot box 90 will immediately start cooling and losing pliability. In one example, a suitable hot box 90 is Current Tools PVC Heaters Model 452, although any suitable hot box 90 capable of heating PVC conduit can be used.

In some aspects of the present disclosure, particularly when handling larger and heavier conduit sections 50, one or more auto-rotating mechanisms 94 such as that illustrated in FIG. 1 can be added to the hot box 90 to help ensure even heating of the conduit section 50 because the conduit section 50 does not need to be turned by hand. For example, when handling 20-foot sections of conduit, the hot box 90 can include an external setup such as the PROFAX 2000 lb. turning rolls available from the Associated Equipment Company, Inc. Heating large and heavy conduit sections can burn up motors in auto-rotating hot boxes. Adding a variable-speed roller set up 94, particularly one that is designed for rolling steel pipe, can solve this issue.

Once the conduit section 50 is heated and a bend is made, the conduit section 50 can be cooled to reduce pliability and set the bend. A commonly-used cooling substance is water due to its availability, cost, and effectiveness. The problem with using water is the mess created once the water has flowed past the conduit section 50. Water remaining on the tabletop surface 20 can create premature cooling for successive conduit section bends. Water that passes below the tabletop can create a slip hazard on hard flooring, dirt, mud, grass, etc.

In response, the apparatus 10 includes a water drainage system 100 disposed at one side edge 26 of the tabletop surface 20. The water drainage system 100 is configured to remove water from the tabletop surface 20 and prevent water from creating a slip hazard on the floor or ground below the tabletop surface 20. In one aspect illustrated in FIG. 2, the water drainage system 100 can be a length of pipe 102 affixed to the apparatus 10 with one end adjacent the tabletop and base surfaces 20, 32, and the other end adjacent a bucket or other liquid receptacle 104. The water drainage system 100 can also include a funnel 106 to aid in collecting water. In other aspects of the present disclosure, the water drainage system 100 can be a hole in the tabletop surface 20 adjacent the base surface 32, a gutter-type structure adjacent the tabletop surface 20, or any other suitable structure capable of collecting water. In still other aspects, the water drainage system 100 can drain into a sink, a floor drain, or any other suitable structure for accepting water from the water drainage system 100.

The water drainage system 100 is further assisted by providing a tilt in the tabletop surface 20 from the rear edge 24 to the front edge 22 such that the rear edge 24 is at a higher elevation than the front edge 22. In related aspects, the base surface 32 can be disposed at a lower elevation than the hot box 90 to enable a user to move a conduit section 50 essentially downhill from the hotbox 90 to the base surface 32. In this manner a single user can manipulate a large conduit section 50 because this arrangement allows for an assist from gravity.

Similarly, the tabletop surface 20 can also be tilted toward the side edge 26 adjacent the water drainage system 100 such that the side edge 26 adjacent the water drainage system 100 is at a lower elevation than the opposite side edge 26. In other aspects of the present disclosure, the tabletop surface 20 can be treated to be hydrophobic or superhydrophobic to assist in removing water from the tabletop surface 20.

The apparatus 10 can further include a water source (not shown) associated with the tabletop surface 20. The water source can be a fixed or temporary tap, hose, tank, or any other suitable source of water that includes a controllable outlet, spraying mechanism, nozzle, or any other suitable mechanism to deliver water to the heated conduit section 50.

The apparatus 10 can also include a first conduit support 110 positioned adjacent a side edge 26 of the tabletop surface 20. The first conduit support 110 is configured to support an end of the conduit section 50 when the conduit section 50 is in the hot box 90 such that one person can heat the conduit section 50 by supporting one end while the other end is supported by the first conduit support 110. The first conduit support 110 is attached to the tabletop 15, the table frame 18, to a wall adjacent the tabletop 15, or to an independent structure adjacent the tabletop 15. The first conduit support 110 can include rollers 112 at a height equivalent to that of the hot box 90 or can be of any other suitable configuration or material.

In another aspect of the present disclosure, the apparatus 10 can include a second conduit support 114 positioned adjacent the side edge 26 of the tabletop surface 20 opposite the first conduit support 110. The second conduit support 114 is configured to support an end of the conduit section 50 when the conduit section 50 is in the hot box 90 such that one person can heat the conduit section 50 without supporting an end of the conduit section 50, where each end is supported by the first and second conduit supports 110, 114. The second conduit support 114 is attached to the tabletop 15, the table frame 18, to a wall adjacent the tabletop 15, or to an independent structure adjacent the tabletop 15. The second conduit support 114 can include rollers 116 at a height equivalent to that of the hot box 90 or can be of any other suitable configuration or material.

The apparatus 10 can be sized to accommodate virtually any length and diameter of conduit section 50. The tabletop surface 20 can be increased in dimension from side edge 26 to side edge 26 to accommodate longer conduit sections 50. The tabletop surface 20 can be increased in dimension from the rear edge 24 to the front edge 22 to accommodate longer portions of conduit section 50 on either side of a bend. Further, the base and movable arm surfaces 32, 46 can be increased in height h to accommodate larger-diameter conduit sections 50.

In use, the hot box 90 is pre-heated to the desired temperature for a given section of PVC conduit 50. Based on design plans, the movable arm 40 is positioned such that the movable arm surface 46 is at the desired angle θ to the base surface 32, where θ is the supplementary angle to the bend angle required for a conduit section 50. The locking mechanism 70 is engaged to maintain the movable arm 40 at the desired angle θ.

A section of conduit 50 is selected. If the conduit section 50 is particularly heavy, auto-rotating rollers 94 can be added adjacent the hot box 90. The selected conduit section 50 is placed into the hot box 90, positioned such that the hot box 90 heats the desired location of a bend. Ends of the conduit section 50 can be supported by first and/or second conduit supports 110, 114 or by personnel. Residence time in the hot box 90 is based on the temperature setting of the hot box 90 and the type and size of the conduit section 50 to be heated.

Once properly heated, the conduit section 50 is removed from the hot box 90 and dropped, placed, or rolled onto the tabletop surface 20 such that desired location of a bend is aligned with the junction of the movable arm surface 46 and the base surface 32. The conduit section 50 is manipulated such that the outer bend edge 56 of the conduit section 50 contacts the movable arm and base surfaces 46, 32, which creates the bend in the conduit section 50. With the conduit section 50 held in place if necessary, water is applied to the bent portion of the conduit section 50 to cool the conduit section 50 and set the bend.

Once cooled, the conduit section 50 returns to a less pliable state and the bend remains in place. The water applied to the conduit section 50 that remains after evaporation travels to the base surface 32 and to the water drainage system 100 where it is collected and disposed of.

The conduit bending apparatus 10 of the present disclosure allows even large PVC conduit sections 50 to be bent consistently and quickly in a controlled environment. The conduit bending apparatus 10 is far more efficient, is more cost effective, uses fewer workers, and is far safer than the prior and current practice of heating PVC conduit in a construction environment and typically outdoors. The conduit bending apparatus 10 allows underground conduit sections and entire underground duct banks to be manufactured offsite. Conduit sections and entire underground duct banks can thereby be shipped to a work site as a completed unit, ready for installation.

While the disclosure has been described in detail with respect to specific aspects thereof, it will be appreciated that those skilled in the art, upon attaining understanding of the foregoing will readily appreciate alterations to, variations of, and equivalents to these aspects. Accordingly, the scope of the present disclosure should be assessed as that of the appended claims and any equivalents thereto. Additionally, all combinations and/or sub-combinations of the disclosed aspects, ranges, examples, and alternatives are also contemplated.

What is claimed:

1. An apparatus for bending a plastic conduit section having ends and a radius, the apparatus comprising:
    a tabletop surface having a front edge, a rear edge, and two side edges;
    a base surface adjacent the front edge, wherein the base surface is perpendicular to the tabletop surface;
    a movable arm having a proximal end, a distal end, and a movable arm surface, wherein the movable arm surface is perpendicular to the tabletop surface, and wherein the proximal end is pivotably attached to or adjacent to the base surface such that the movable arm is configured to pivot azimuthally around the proximal end along the tabletop surface;
    a locking mechanism configured to lock the movable arm such that the movable arm surface is at a desired angle to the base surface;
    a hot box disposed adjacent the tabletop surface and configured to heat plastic conduit; and
    a water drainage system disposed adjacent the tabletop surface and configured to remove water from the tabletop surface.

2. The apparatus of claim 1, wherein the tabletop surface is tilted such that the rear edge is higher in elevation than the front edge.

3. The apparatus of claim 1, wherein the water drainage system is disposed adjacent a side edge, and wherein the tabletop surface is tilted such that the side edge without the water drainage system is higher in elevation than the side edge with the water drainage system.

4. The apparatus of claim 1, wherein the hot box includes an auto-rotating mechanism.

5. The apparatus of claim 1, wherein the base surface and the movable arm surface each have heights, and wherein the heights are greater than the radius of the conduit section.

6. The apparatus of claim 1, wherein the conduit section when in the apparatus has an outside curve line and an inside curve line defining a conduit plane, wherein the conduit plane is parallel to the tabletop surface, and wherein the movable arm surface and the base surface contact the outside curve line and not the inside curve line.

7. The apparatus of claim 1, wherein the locking mechanism includes holes in the tabletop surface.

8. The apparatus of claim 1, wherein the locking mechanism includes a slot in the tabletop surface.

9. The apparatus of claim 1, wherein the movable arm surface and the base surface are planar.

10. The apparatus of claim 1, wherein one of the movable arm surface and the base surface is concave.

11. The apparatus of claim 1, further comprising an angle indicator configured to indicate the angle of the movable arm surface relative to the base surface.

12. The apparatus of claim 11, wherein the angle indicator is disposed on the tabletop surface.

13. The apparatus of claim 1, further comprising a water supply.

14. The apparatus of claim 13, wherein the water supply includes a water spraying mechanism.

15. The apparatus of claim 1, further comprising a first conduit support adjacent a side edge, wherein the first conduit support is configured to support a conduit section end.

16. The apparatus of claim 15, further comprising a second conduit support adjacent the other side edge, wherein the second conduit support is configured to support a conduit section end.

17. An apparatus for bending a plastic conduit section having ends and a radius, the apparatus comprising:
- a tabletop surface having a front edge, a rear edge, and two side edges;
- a base surface adjacent the front edge, wherein the base surface is perpendicular to the tabletop surface;
- a movable arm having a proximal end, a distal end, and a movable arm surface, wherein the movable arm surface is perpendicular to the tabletop surface, wherein the proximal end is pivotably attached to or adjacent to the base surface such that the movable arm is configured to pivot azimuthally around the proximal end along the tabletop surface, wherein the base surface and the movable arm surface each have heights, and wherein the heights are greater than the radius of the conduit section;
- an angle indicator configured to indicate the angle of the movable arm surface relative to the base surface;
- a locking mechanism configured to lock the movable arm such that the movable arm surface is at a desired angle to the base surface;
- a hot box disposed adjacent the tabletop surface and configured to heat plastic conduit; and
- a water drainage system disposed adjacent one side edge and configured to remove water from the tabletop surface, wherein the tabletop surface is tilted such that the side edge without the water drainage system is higher in elevation than the side edge with the water drainage system.

18. The apparatus of claim 17, wherein the base surface is disposed at a lower elevation than the hot box.

19. The apparatus of claim 17, wherein the locking mechanism includes holes in the tabletop surface.

20. An apparatus for bending a plastic conduit section having ends and a radius, the apparatus comprising:
- a tabletop surface having a front edge, a rear edge, and two side edges, wherein the tabletop surface is tilted such that the rear edge is higher in elevation than the front edge;
- a base surface adjacent the front edge, wherein the base surface is perpendicular to the tabletop surface;
- a movable arm having a proximal end, a distal end, and a movable arm surface, wherein the movable arm surface is perpendicular to the tabletop surface, wherein the proximal end is pivotably attached to or adjacent to the base surface such that the movable arm is configured to pivot azimuthally around the proximal end along the tabletop surface, wherein the base surface and the movable arm surface are planar and each have heights, and wherein the heights are greater than the radius of the conduit section;
- an angle indicator configured to indicate the angle of the movable arm surface relative to the base surface, wherein the angle indicator is disposed on the tabletop surface;
- a locking mechanism configured to lock the movable arm such that the movable arm surface is at a desired angle to the base surface;
- a hot box disposed adjacent the tabletop surface and configured to heat plastic conduit; and
- a water drainage system disposed at one side edge and configured to remove water from the tabletop surface, wherein the tabletop surface is tilted such that the side edge without the water drainage system is higher in elevation than the side edge with the water drainage system.

* * * * *